US011133036B2

(12) United States Patent
Goshen et al.

(10) Patent No.: US 11,133,036 B2
(45) Date of Patent: Sep. 28, 2021

(54) SYSTEM AND METHOD FOR ASSOCIATING AUDIO FEEDS TO CORRESPONDING VIDEO FEEDS

(71) Applicant: InSoundz Ltd., Tel Aviv (IL)

(72) Inventors: Tomer Goshen, Tel Aviv (IL); Emil Winebrand, Petach Tikva (IL)

(73) Assignee: Insoundz Ltd., Tel Aviv (IL)

( * ) Notice: Subject to any disclaimer, the term of this patent is extended or adjusted under 35 U.S.C. 154(b) by 88 days.

(21) Appl. No.: 15/919,642

(22) Filed: Mar. 13, 2018

(65) Prior Publication Data

US 2018/0261255 A1 Sep. 13, 2018

Related U.S. Application Data

(60) Provisional application No. 62/470,337, filed on Mar. 13, 2017.

(51) Int. Cl.

| | |
|---|---|
| ***G11B 27/34*** | (2006.01) |
| ***H04N 21/43*** | (2011.01) |
| ***H04N 21/439*** | (2011.01) |
| ***H04N 21/435*** | (2011.01) |
| ***H04N 21/422*** | (2011.01) |
| ***H04N 21/845*** | (2011.01) |
| ***H04N 21/4728*** | (2011.01) |
| ***H04N 21/44*** | (2011.01) |
| ***H04N 9/82*** | (2006.01) |
| *H04N 5/77* | (2006.01) |

(52) U.S. Cl.

CPC ........... *G11B 27/34* (2013.01); *H04N 9/8211* (2013.01); *H04N 21/42203* (2013.01); *H04N 21/435* (2013.01); *H04N 21/4307* (2013.01); *H04N 21/4394* (2013.01); *H04N 21/44008* (2013.01); *H04N 21/4728* (2013.01); *H04N 21/8455* (2013.01); *H04N 5/77* (2013.01); *H04N 5/772* (2013.01)

(58) Field of Classification Search

CPC .... G11B 27/34; H04N 5/772; H04N 21/4307; H04N 21/4394; H04N 21/435; H04N 9/8211; H04N 21/8455; H04N 21/4728; H04N 21/44008; H04N 5/77; H04N 21/42203

USPC .......................................................... 386/338

See application file for complete search history.

(56) References Cited

U.S. PATENT DOCUMENTS

| | | | |
|---|---|---|---|
| 4,741,038 | A | 4/1988 | Elko et al. |
| 5,335,011 | A | 8/1994 | Addeo et al. |
| 6,449,593 | B1 | 9/2002 | Valve |
| 6,707,910 | B1 | 3/2004 | Valve et al. |
| 6,836,243 | B2 | 12/2004 | Kajala |
| 7,706,549 | B2 | 4/2010 | Zhang et al. |
| 7,986,794 | B2 | 7/2011 | Zhang |
| 2005/0018861 | A1 | 1/2005 | Tashev |
| 2013/0003981 | A1 | 1/2013 | Lane |
| 2013/0034241 | A1 | 2/2013 | Pandey et al. |

(Continued)

*Primary Examiner* — Loi H Tran

(74) *Attorney, Agent, or Firm* — M&B IP Analysts, LLC

(57) ABSTRACT

A system and method for associating audio feeds to corresponding video feeds, including determining a subject of interest within a video feed based on the video feed and metadata associated with the video feed; analyzing the metadata to determine an optimal audio source for the subject of interest; configuring the optimal audio source to capture an audio feed; and associating the captured audio feed with the video feed.

20 Claims, 4 Drawing Sheets

100
Database
118
Recording Interface
110-1
Recording Interface
110-n
120
Analyzer
112
PC
114
Mem
116

(56) References Cited

U.S. PATENT DOCUMENTS

| | | | | |
|---|---|---|---|---|
| 2013/0051577 | A1 | 2/2013 | Morcelli et al. | |
| 2013/0170666 | A1 | 7/2013 | Ng et al. | |
| 2013/0216046 | A1 | 8/2013 | Ikeda et al. | |
| 2013/0315404 | A1* | 11/2013 | Goldfeder | H04R 3/005<br>381/58 |
| 2014/0029761 | A1 | 1/2014 | Maenpaa et al. | |
| 2014/0180684 | A1 | 6/2014 | Strub | |
| 2015/0113013 | A1* | 4/2015 | Rys | H04N 21/23109<br>707/758 |
| 2016/0249134 | A1* | 8/2016 | Wang | H04R 3/005 |
| 2018/0114068 | A1* | 4/2018 | Balasundaram | G06T 7/143 |
| 2018/0226086 | A1* | 8/2018 | Huang | H04R 1/406 |
| 2018/0232592 | A1* | 8/2018 | Stewart | G08B 13/19606 |
| 2019/0356936 | A9* | 11/2019 | Foutzitzis | H04N 21/23418 |

* cited by examiner

SYSTEM AND METHOD FOR ASSOCIATING AUDIO FEEDS TO CORRESPONDING VIDEO FEEDS

CROSS-REFERENCE TO RELATED APPLICATIONS

This application claims the benefit of U.S. Provisional Application No. 62/470,337 filed on Mar. 13, 2017, the contents of which are hereby incorporated by reference.

TECHNICAL FIELD

The present disclosure relates generally to systems for capturing audio signals in a three-dimensional space and particularly to system and methods for associating audio feeds to corresponding video feeds.

BACKGROUND

The consumption of multimedia content is ever-increasing, with more content to access and more options to access such content, thanks in part to network connected mobile devices and the ubiquity of Internet streaming content. While images, both still photography and video, powerfully convey ideas and content, audio plays a crucial role in conveying information, as well as mood and tone, to an end user. Audio includes dialog spoken, background music, voiceover commentary, environmental recordings, and the like. As many users find the audio experience to be highly important, broadcasting networks and content providers value the audio presentation associated the visual content.

This importance becomes increasingly significant the shown content includes multiple sub-events occurring concurrently. For example, while viewing a sporting event, many viewers may be interested in listening to a conversation between two or more players, the instructions given by a coach to their team, an exchange of words between a player and an umpire or referee, conversations between players and fans, and similar verbal communications that often occur simultaneously.

The challenge of providing a consumer with such audio content is that currently implemented sound capturing devices, i.e., microphones, are unable to practically adjust to the dynamic and intensive environment of, for example, a sporting event. Currently used microphones and audio systems are often incapable of tracking a single player or coach as that person runs, turns, or otherwise moves.

Commonly, a large microphone boom is used, often with the assistance of a boom operator, to adjust the microphone position in an attempt to capture the sound within a venue. However, a single boom operator is limited in one location at a time, which can be limiting in scenarios with sound sources spread over a wider area. Even when multiple microphone operators are used to capture sound within an area, a technician may be required to switch between various recording sources to match with a broadcast video feed with the best available audio source. This issue is becoming significantly more notable due to the advent of high-definition (HD) television that provides high-quality images on the screen which allow users to see content clearly without a matching upgrade in audio quality.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Certain embodiments disclosed herein include a method for associating audio feeds to corresponding video feeds, including: determining a subject of interest within a video feed based on the video feed and metadata associated with the video feed; analyzing the metadata to determine an optimal audio source for the subject of interest; configuring the optimal audio source to capture an audio feed; and associating the captured audio feed with the video feed.

Certain embodiments disclosed herein also include a non-transitory computer readable medium having stored thereon instructions for causing a processing circuitry to perform a process, the process including: determining a subject of interest within a video feed based on the video feed and metadata associated with the video feed; analyzing the metadata to determine an optimal audio source for the subject of interest; configuring the optimal audio source to capture an audio feed; and associating the captured audio feed with the video feed.

Certain embodiments disclosed herein also include a system for associating audio feeds to corresponding video feeds, including: a processing circuitry; and a memory, the memory containing instructions that, when executed by the processing circuitry, configure the system to: determine a subject of interest within a video feed based on the video feed and metadata associated with the video feed; analyze the metadata to determine an optimal audio source for the subject of interest; configure the optimal audio source to capture an audio feed; and associate the captured audio feed with the video feed.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
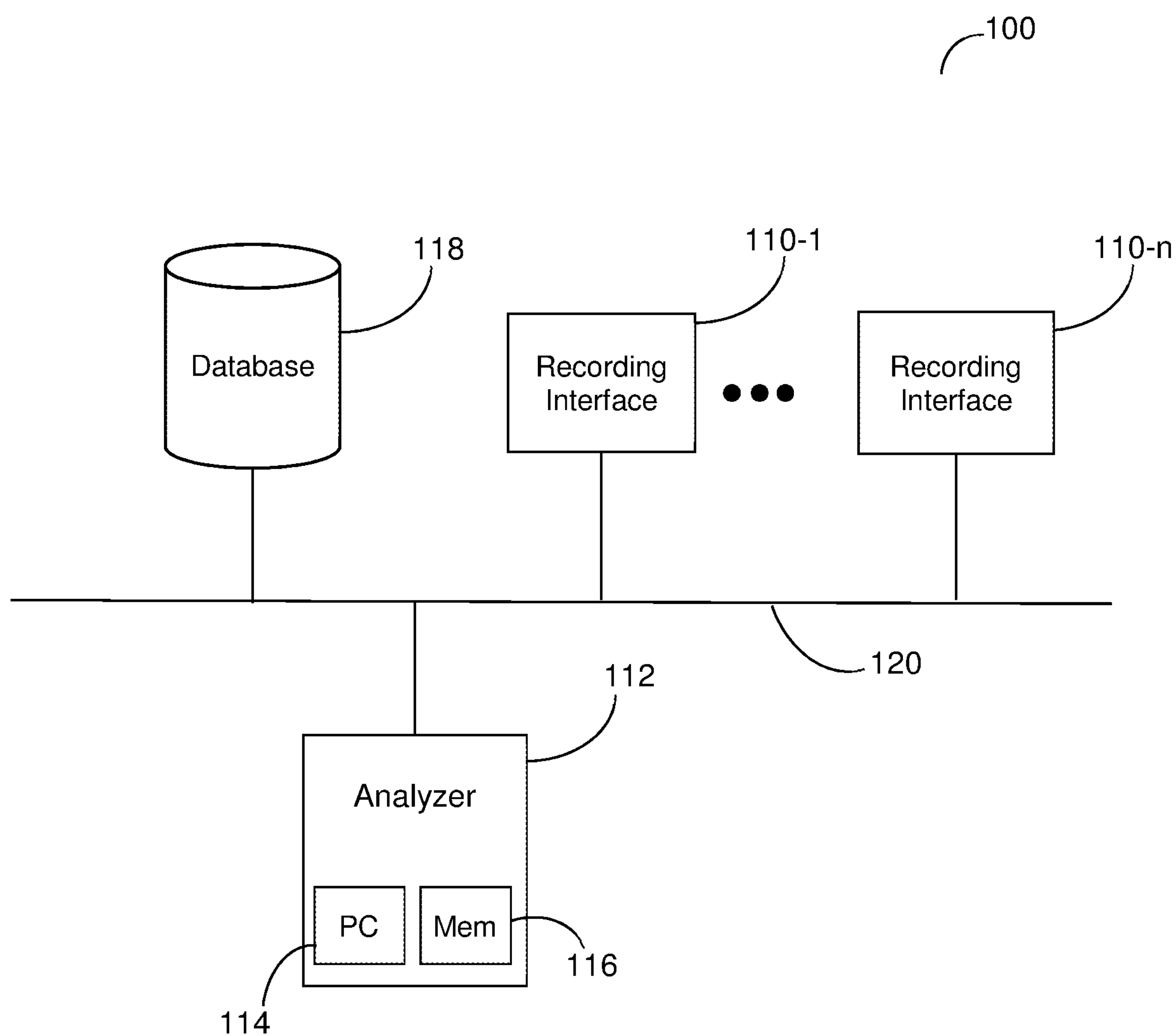
FIG. 1 is an example block diagram of a system for associating audio feeds to video feeds according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for associating one or more audio feeds with an associated video, where an optimal audio feed is determined based on metadata received relating to the video feed.

FIG. 1 shows an example block diagram of a system 100 for associating audio feeds to video feeds according to an embodiment. The system 100 includes one or more recording interfaces 110-1 to 110-*n*, that are connected to a database 118 and an analyzer 112, e.g., via a bus 120. The recording interface 110-1 to 110-*n* (hereinafter "recording interface" or "recording interfaces" for simplicity), wherein n is an integer equal to or greater than 1, are devices configured to capture sound, such as microphones, and may include devices adapted to convert audio signals to digital signals to relay the recording sounds over an electronic network. In an embodiment, multiple recording devices 110 are connected to the system 100, where each recording device 110 can be placed at various locations within an area of interest. The recording devices 110 may be held and directed by an operator, such as a sound technician, or may be mounted onto a stationary mount, such as on a tripod or similar stand.

The recording interface 110 is configured to relay recorded audio to the analysis unit 112. The analysis unit 112 may include a processing circuitry 114 and a memory 116. The processing circuitry 114 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

In an embodiment, the memory 116 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 114 to perform the various processes described herein. Specifically, the instructions, when executed, cause the processing circuitry 114 to perform analysis of incoming audio recording, as discussed herein below. In a further embodiment, the memory 116 may further include a memory portion including the instructions.

The analyzer 112 is configured to receive audio signals from the recording interface 110 along with metadata associated with a video recording. The metadata includes, but is not limited to, a location pointer indicating the location of the video recording, a time pointer indicating the time of the recording, the angle or position at which the recording occurred, and a context associated with the video. Context may include, but is not limited to, a subject of interest, a topic of interest, and the like. The video recording may be received from a video camera (not shown) connected to the system 100.

The analyzer 112 may be configured to receive metadata associated with a video feed, wherein the metadata includes information associated with an image capture, such as face recognition, location recognition, angle of a capturing camera, time of capture, and the like. The metadata may be received from the video camera, or from an external source (e.g., an intermediate server placed between the video camera and the analyzer 112).

In an embodiment, the analyzer 112 is configured to associate a audio signal or signals received from the recording interface 110 with a video capture, such as a live video feed. The audio signal may be associated with a video feed in real-time, simultaneous to both the audio and the video feed. In an alternative embodiment, the association of the audio feed with the video capture may occur post-capture, e.g., after both streams have been fully recorded and stored, e.g., in a database.

In an embodiment, a tag is associated with each captured audio feed, where the tag contains information, e.g., a textual string, indicating the time and place of the capture. The tag may further contain additional elements associated with the metadata of the audio feed, e.g., subject matter of the audio feed, voice recognition of a subject within the audio feed, and the like.

A tag, e.g., the textual string associated with a captured audio feed, is searchable by the system 100 and may be stored within the database 118. In an alternative embodiment, the tag is stored in a cloud-based location in addition to, or in place of, the database 118. Additionally, in some embodiments, a received audio recording is partially or wholly stored within the database 118 and may be used as future reference when analyzing audio recordings.

Upon receiving a video feed and associated metadata, the analyzer 112 is configured to generate a query based on the metadata and received video feed, where the query includes a search for tags within the database 118 matching audio signals or samples determined to be associated with the video feed. As an example, a query may be Davis's dunk on Paul, which corresponds to a certain event at a certain time during a basketball game. The query is used a search query where responsive thereto, the audio and video associated therewith are received. The query may be a graphic query, a textual query, a combination thereof, portions thereof, and the like. The audio feeds received in response to the query are provided as an output.

Figure 2:
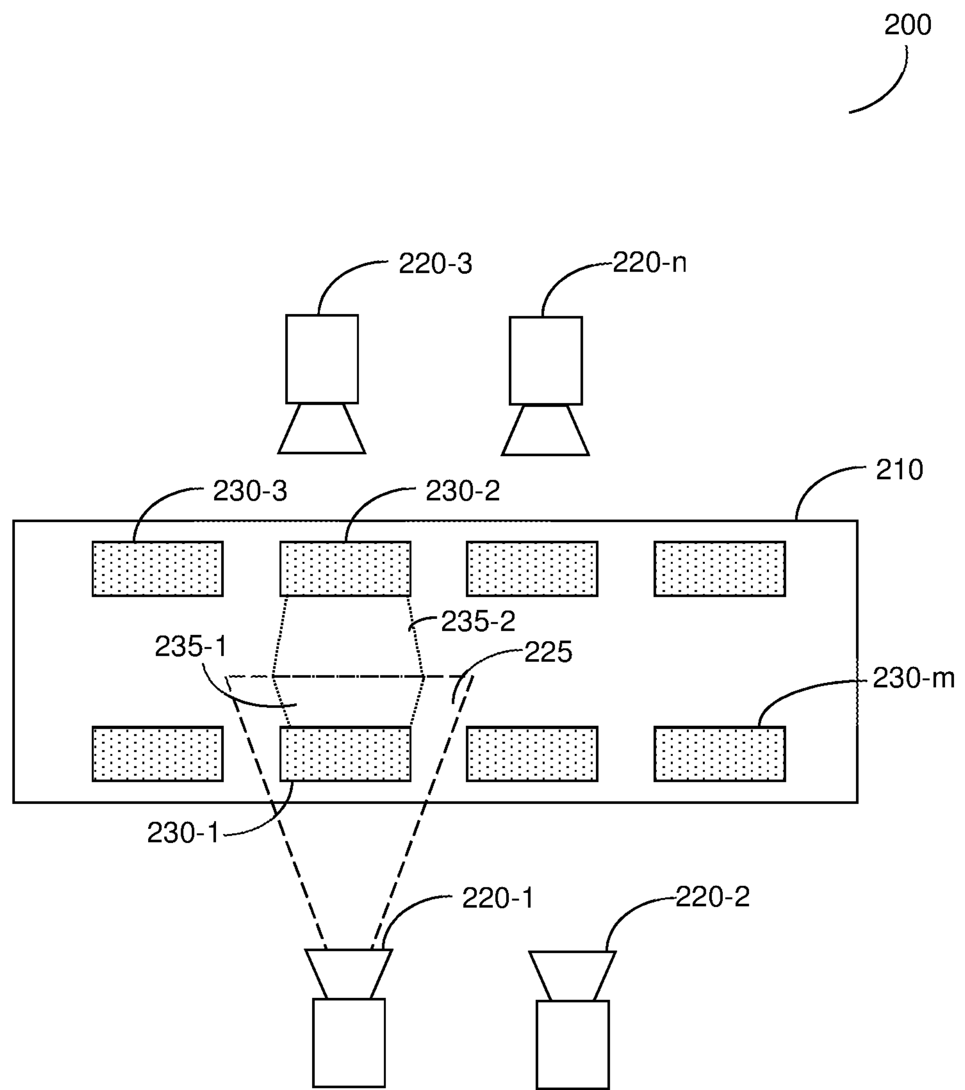
FIG. 2 is a schematic diagram of the operation of the disclosed system according to an embodiment.

FIG. 2 is a schematic diagram 200 of the operation of the system, e.g., system 100 of FIG. 1, according to an embodiment. The system is used in order to associating optimal audio, e.g., from an optimal audio source, to a video feed.

A plurality of cameras 220-1 through 220-*n* (hereinafter "camera" or "cameras" 220 for simplicity), where n is an integer equal to or greater than 1, are placed at various positions within a venue 210. The cameras 220 are configured to capture one or more video frames within the venue 210. The venue 220 may be a public or private area of various sizes, such as, but not limited to, a sporting arena, a stadium, a concert hall, a television recording studio, and the like. A plurality of microphones 230-1 to 230-*m* (hereinafter "microphone" or "microphones" 230 for simplicity), where m is an integer equal to or greater than 1, are additionally positioned within the venue 210 at various locations. The microphones 230 are configured to capture audio feed within the venue 210. The microphones 230 may be, for example, mobile microphones, stationary microphones, lavalier microphones, microphones mounted onto a boom, shotgun microphones, and so on.

According to an embodiment, upon receiving video feed 225 captured by the camera 220-1, metadata associated with the video feed is identified by the system 100 as further described hereinabove with respect of FIG. 1. The metadata includes, but is not limited to, a location pointer indicating the location of the video source, a time pointer indicating the time of the recording, the angle or position at which the recording occurred, and a context associated with the video. Context may include, but is not limited to, a subject of interest, a topic of interest, and the like.

The context may be a certain visual element shown in a multimedia content element which is determined by the system 110 as the point of interest in the multimedia content element. As a non-limiting example, in a video feed of a basketball game, the context may be a certain basketball player shown therein. The context may further be selected based on audio feeds identified as indicative thereof.

Based on the received metadata, the system 100 is configured to identify one or more microphones 230 of the plurality of microphones 230 as potentially suitable for capturing desired audio feed associated with the video feed 225, namely an optimal audio source. In the example shown in FIG. 2, microphones 230-1 and 230-2 may be determined to be closest to the area covered by the video feed 225 as indicated by a location pointer, and both microphones may be selected as the preferred optimal source of audio feed.

It should be noted that the distance of the microphone to the subject matter of the video feed may be one factor in determining an optimal audio source, but need not be the only factor. For example, a subject matter of interest may be determined to be a basketball coach positioned next to a basketball team bench, where a first microphone is placed at a distance of 10 feet from the bench, and a second microphone is positioned at a distance of 30 feet from the bench. The second microphone may be determined to be an optimal audio source and the first microphone may be determined not to be an optimal audio source if the second microphone is a shotgun microphone configured to pick up audio signals from a very narrow angle, where the second microphone is directed toward the coach, and where the first microphone is a standard microphone directed away from the coach.

The system 100 configures the microphones 230-1 and 230-2 to capture audio feed associated with the video feed 225, the audio feed shown as 235-1 and 235-2 in FIG. 2. The captured audio feed may then be provided in real-time together with the captured video feed 225. According to an embodiment, a trigger for starting the operation of the system 100 and the selection of microphones 230 may be an indication received from a user device, e.g., a control panel, of a request to broadcast from the camera 220-1.

Figure 3:
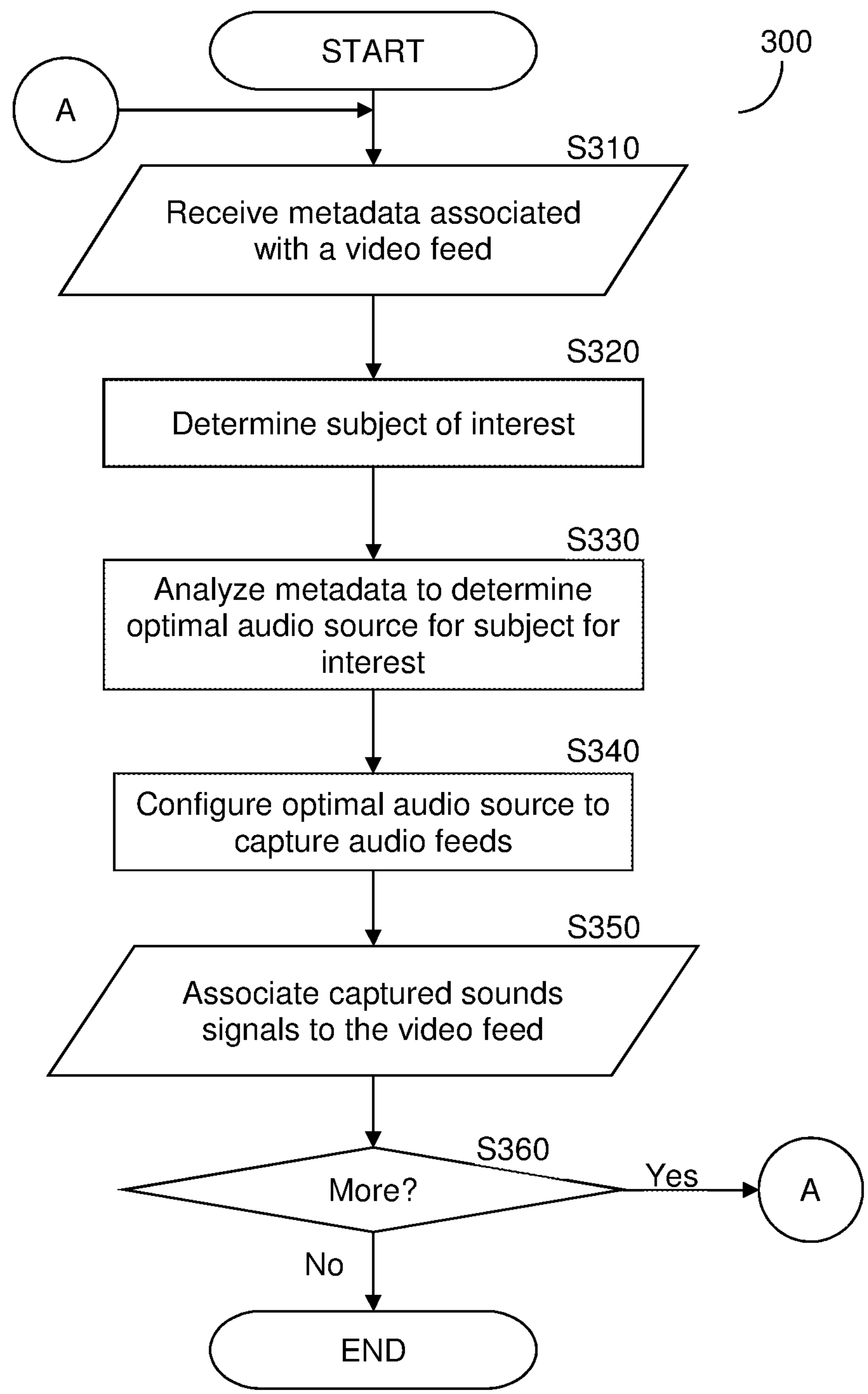
FIG. 3 is a flowchart of the method for associating audio feeds to corresponding video feeds according to an embodiment.

FIG. 3 is a flowchart 300 of the method for associating audio feeds to corresponding video feeds according to an embodiment. At S310, metadata of at least one video feed is received. Metadata includes, but is not limited to, a location pointer indicating the location of the video source, a time pointer indicating the time of the recording, the angle or position at which the recording occurred, and a context associated with the video. Context may include, but is not limited to, a subject of interest, a topic of interest, and the like. In an embodiment, in addition to the metadata associated with a video feed, the video feed itself is received as well. The metadata and the video feed may be received by a processing circuity, e.g., the processing circuity of the analyzer 112 of FIG. 1.

At S320, the subject of interest is determined. The subject of interest may be based on the context, may be identified by a user input, e.g., a specific subject of interest may be chosen by a user and received in addition to the metadata, or may be based on both.

At S330, the metadata is analyzed to determine an optimal audio source for the video feed based on the determined subject of interest. The metadata may indicate that a particular person, or event, or physical location that is present within a video feed. An optimal audio source is an audio source capable of producing the most desirable audio associated with the subject of interest. Desirable audio include audio related to the subject of interest that is clear and with minimal distortion or interference from external audio sources or other subjects near the subject of interest, e.g., when compared to audio receive from other audio sources, and volume of capture audio associated with the subject of interest. The optimal audio source may include one or more recording interfaces, such as microphones, as described above. In an embodiment, the determination of the optimal audio source is based on similar previously analyzed audio sources and video feeds. For example, based on the received metadata, a query may be sent to a database to compare the metadata and video source to similar video sources and audio sources to determine the optimal audio source.

At S340, the optimal audio source is configured to capture audio feed corresponding to the subject of interest related to the at least one video feed. At S350, the captured audio feed is associating to the at least one video feed. In an embodiment, the optimal audio and the video are relayed to a single end device. For example, if a user is watching a basketball game via an interactive interface, where the user can select from various camera view, each focusing on a different player or coach, the user may select a camera focusing on the coach of the home team, and the audio feed determined to be optimal based on the video feed of the coach will be relayed to the user in conjunction with the selected video feed.

At optional S360, it is checked whether additional metadata has been received and if so, execution continues with S310; otherwise, execution terminates.

Figure 4:
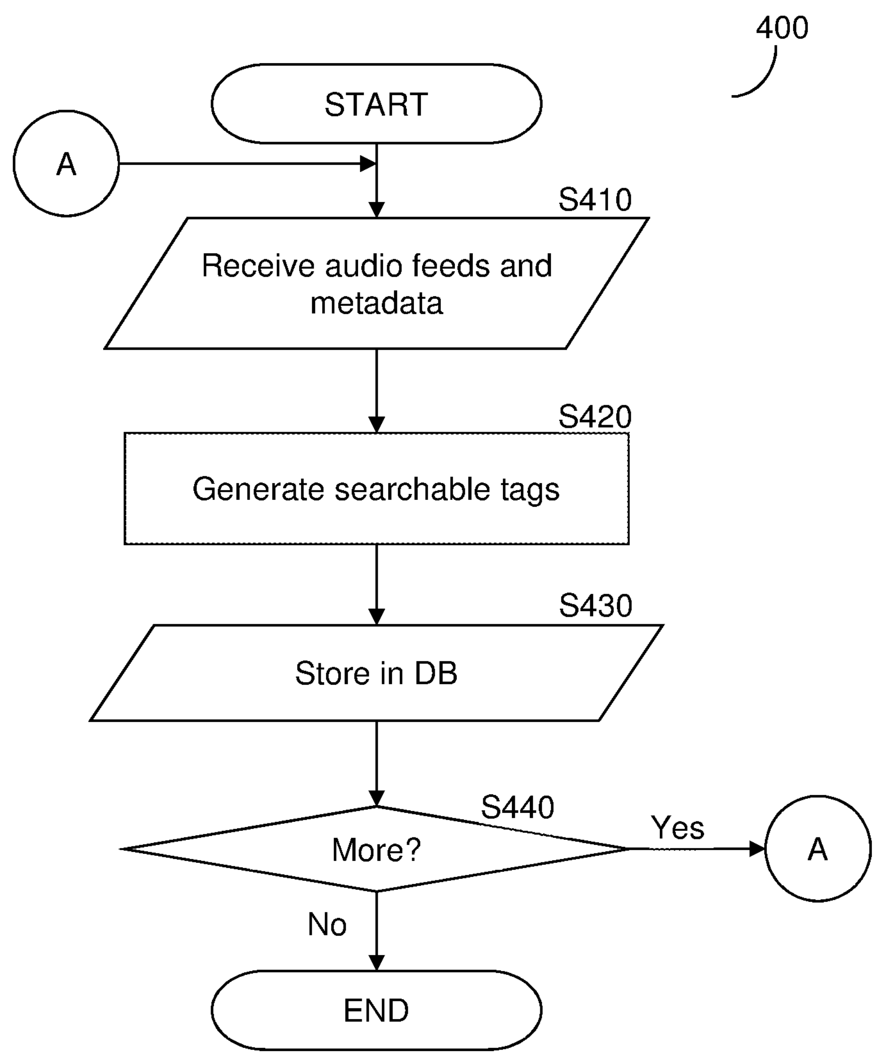
FIG. 4 is a flowchart of a method for generating a tagged database of audio feeds according to an embodiment.

FIG. 4 is a flowchart 400 of a method for generating a tagged database of audio feeds according to an embodiment. At S410, audio feeds and metadata associated therewith is received, e.g., from the cameras and microphones of FIG. 2.

The metadata is indicative of at least a location and time pointers. The metadata may further include, but is not limited to, the angle or position at which the recording occurred, the context associated with the video, and the like. At S420, tags are generated based on the metadata and are associated with the received audio feed. The generated tags are searchable by a system, e.g., the system 100 of FIG. 1, by user devices, e.g., smartphones, computers, and the like.

At S430, the audio feeds are sent for storage in a database in association with the generated tags. According to further embodiment, at S430, the audio feeds are generated respective of the audio feeds and sent for storage in association with the generated tag. At S440, it is checked whether additional audio feeds and metadata have been received and if so, execution continues with S410; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for associating audio feeds to corresponding video feeds, comprising:

determining a subject of interest within a video feed based on the video feed and metadata associated with the video feed, wherein the video feed is captured by a video source, wherein the metadata includes a location pointer indicating a location of the video source;

analyzing the metadata to determine an optimal audio source for the subject of interest based on the location of the video source and a location of each of a plurality of audio sources, wherein audio captured by the optimal audio source has minimal interference from external audio sources near the subject of interest among the plurality of audio sources, wherein the optimal audio source is determined based on a distance between each of the plurality of audio sources and the subject of interest of the video feed, wherein the plurality of audio sources are positioned at a plurality of respective locations, wherein the optimal audio source is determined from among the plurality of audio sources;

configuring the optimal audio source to capture an audio feed; and associating the captured audio feed with the video feed.

2. The method of claim 1, wherein the metadata includes at least one of: a location pointer indicating the location of the video feed, a time pointer indicating the time of recording of the video feed, the angle or position at which recording of the video feed occurred, and a context associated with the video feed.

3. The method of claim 2, wherein the context includes at least one of: a subject of interest and a topic of interest.

4. The method of claim 1, wherein the optimal audio source includes at least one of: a mobile microphone, a stationary microphone, a lavalier microphone, a microphone mounted onto a boom, and a shotgun microphone.

5. The method of claim 1, further comprising:

generating a searchable tag based on the metadata; and associating the searchable tag with captured audio feeds.

6. The method of claim 5, further comprising:

storing the searchable tag in a database.

7. The method of claim 6, wherein analyzing the metadata to determine an optimal audio source includes querying searchable tags in the database.

8. The method of claim 1, wherein determining the subject of interest is further based on user input.

9. The method of claim 1, wherein the optimal audio source is determined based further on at least one of: the clarity of audio received from a first audio source compared to the clarify of audio received from a second audio source, and volume of captured audio associated with the subject of interest.

10. The method of claim 1, wherein the optimal audio source is determined based further on a directionality of each of the plurality of audio sources.

11. A non-transitory computer readable medium having stored thereon instructions for causing a processing circuitry to perform a process, the process comprising:

determining a subject of interest within a video feed based on the video feed and metadata associated with the video feed, wherein the video feed is captured by a video source, wherein the metadata includes a location pointer indicating a location of the video source;

analyzing the metadata to determine an optimal audio source for the subject of interest based on the location of the video source and a location of each of a plurality of audio sources, wherein audio captured by the optimal audio source has minimal interference from external audio sources near the subject of interest among the plurality of audio sources, wherein the optimal audio source is determined based on a distance between each of the plurality of audio sources and the subject of interest of the video feed, wherein the plurality of audio sources are positioned at a plurality of respective locations, wherein the optimal audio source is determined from among the plurality of audio sources;

configuring the optimal audio source to capture an audio feed; and associating the captured audio feed with the video feed.

12. A system for associating audio feeds to corresponding video feeds, comprising:

a processing circuitry; and a memory, the memory containing instructions that, when executed by the processing circuitry, configure the system to:

determine a subject of interest within a video feed based on the video feed and metadata associated with the video feed, wherein the video feed is captured by a video source, wherein the metadata includes a location pointer indicating a location of the video source;

analyze the metadata to determine an optimal audio source for the subject of interest based on the location of the video source and a location of each of a plurality of audio sources, wherein audio captured by the optimal audio source has minimal interference from external audio sources near the subject of interest among the plurality of audio sources, wherein the optimal audio source is determined based on a distance between each of the plurality of audio sources and the subject of interest of the video feed, wherein the plurality of audio sources are positioned at a plurality of respective locations, wherein the optimal audio source is determined from among the plurality of audio sources;

configure the optimal audio source to capture an audio feed; and associate the captured audio feed with the video feed.

13. The system of claim 12, wherein the metadata includes at least one of: a location pointer indicating the location of the video feed, a time pointer indicating the time of recording of the video feed, the angle or position at which recording of the video feed occurred, and a context associated with the video feed.

14. The system of claim 13, wherein the context includes at least one of: a subject of interest and a topic of interest.

15. The system of claim 12, wherein the optimal audio source includes at least one of: a mobile microphone, a stationary microphone, a lavalier microphone, a microphone mounted onto a boom, and a shotgun microphone.

16. The system of claim 12, wherein the system is further configured to:

generate a searchable tag based on the metadata; and associate the searchable tag with captured audio feeds.

17. The system of claim 16, wherein the system is further configured to:

store the searchable tag in a database.

18. The system of claim 17, wherein analyze the metadata to determine an optimal audio source includes querying searchable tags in the database.

19. The system of claim 12, wherein determine the subject of interest is further based on user input.

20. The system of claim 12, wherein the optimal audio source is determined based further on at least one of: the clarity of audio received from a first audio source compared to the clarify of audio received from a second audio source, and volume of captured audio associated with the subject of interest.

* * * * *